G. R. INSHAW.
ADJUSTABLE WIND SCREEN JOINT FOR MOTOR AND OTHER VEHICLES.
APPLICATION FILED JULY 20, 1911.
1,050,944.
Patented Jan. 21, 1913.
2 SHEETS—SHEET 1.
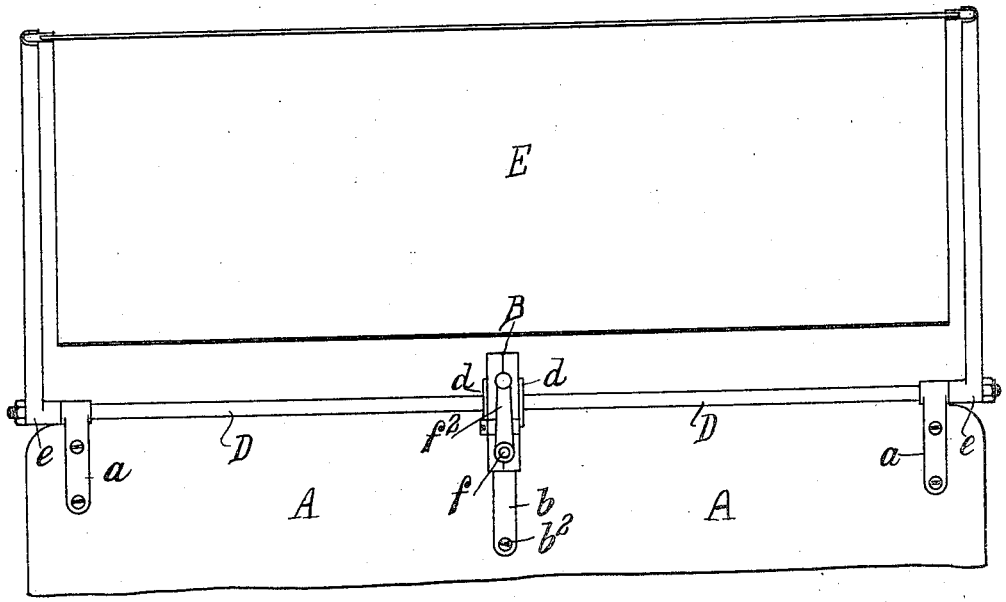
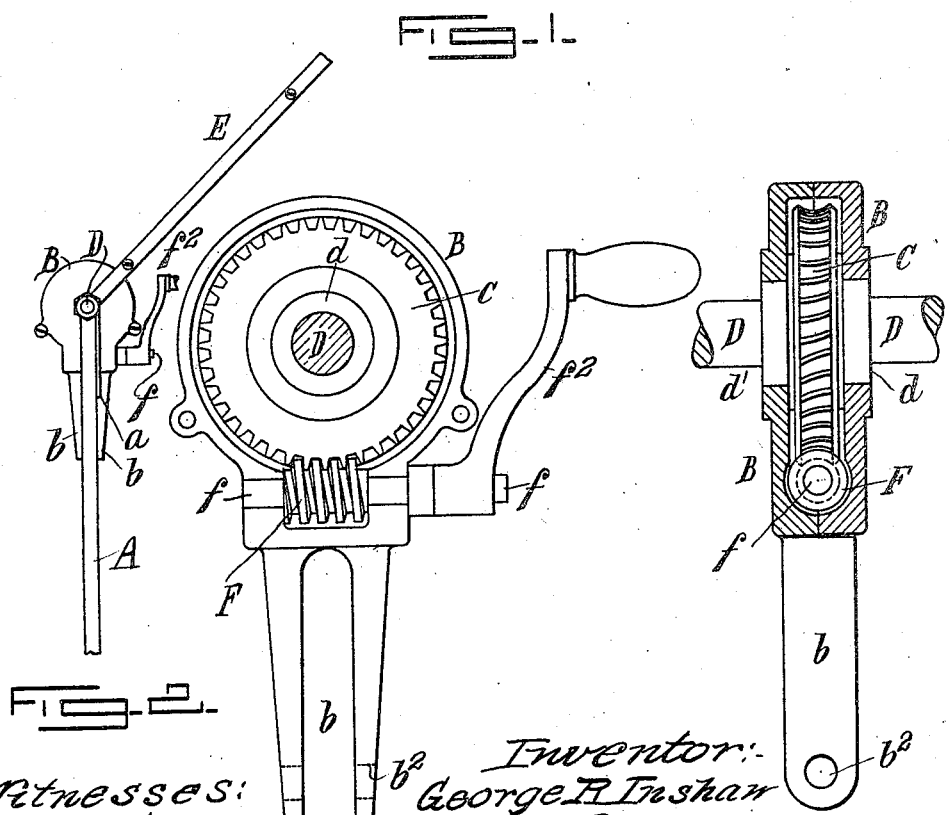

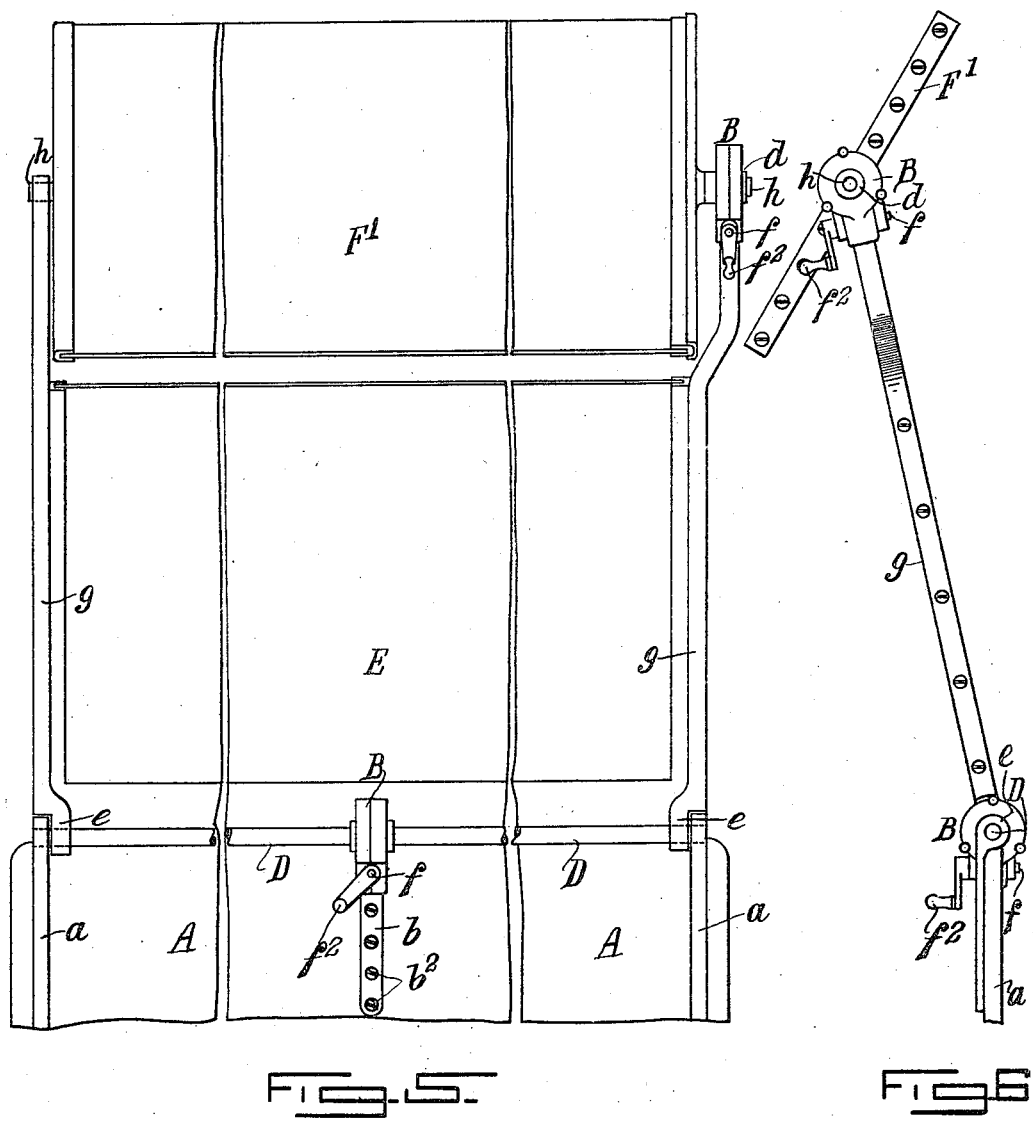

UNITED STATES PATENT OFFICE.

GEORGE RICHARD INSHAW, OF UDDINGSTON, SCOTLAND.

ADJUSTABLE WIND-SCREEN JOINT FOR MOTOR AND OTHER VEHICLES.

1,050,944.     Specification of Letters Patent.     Patented Jan. 21, 1913.

Application filed July 20, 1911. Serial No. 639,671.

*To all whom it may concern:*

Be it known that I, GEORGE RICHARD INSHAW, of Uddingston, Scotland, have invented new and useful Improvements in Adjustable Wind-Screen Joints for Motor and other Vehicles, of which the following is a specification.

The object of my invention is to provide simple and reliable means for adjusting the wind-screens of motor cars, and other vehicles, which will enable the adjustment to any desired angle to be effected by the use of only one hand and so that the screen is, by means of adjustment, maintained in the positions to which it has been brought.

According to my invention I employ a worm-wheel, or worm-quadrant, or other sufficient part of a worm-wheel (I will refer to it as a worm-wheel) and an engaging worm-pinion respectively in connection with the wind-screen and the part of the vehicle at which it is used, so arranged that, by turning the said pinion, the worm-wheel will be operated and will, in turn, operate the wind-guard, to alter its angle, the pitch of the teeth of the worm-wheel and of the worm-pinion being such that as the wheel and pinion remain interlocked in any position they retain the wind-screen in its adjusted position.

I will describe, with reference to the accompanying drawings, an arrangement in accordance with my invention, as applied to a one-part wind-screen and a two-part wind-screen with one adjustable part and two adjustable parts respectively.

Figures 1 and 2 are respectively side and end elevations showing the wind-screen and dash-board, of a vehicle with a joint and adjusting mechanism, according to this invention, applied thereto. Figs. 3 and 4 show, in elevations (partly in section) at right angles to each other, the operating mechanism separately. Figs. 5 and 6 are respectively side and end elevations showing a two-part wind-screen with joints and adjusting mechanism.

On the dash-board A of the vehicle I fix a box B, which is shown as being made in two parts secured together by screws, or otherwise, and having formed, on one of the parts, a forked extension $b$ which is passed over the dash-board and secured by a screw, or screws, as at $b^2$, the dash-board being formed with a recess for the reception of the lower part of the box B. In the said box B, is a worm-wheel C, fixed to a shaft D, between collars $d$, which can rotate in bearings formed in the sides of the box B. The said shaft D extends across the dash-board A and is mounted in bearing pieces $a$ (see Figs. 1 and 3) fixed to the said board, and bosses $e$, on the end frames of the screen, E, are secured to the ends of the shaft D. In the box B is also a worm-pinion F engaging with the worm-wheel C, the spindle $f$ of which can rotate in bearings in the said box B. A handle $f^2$ is fixed to the end of the spindle $f$ which projects from the box B.

In the construction illustrated in Figs. 5 and 6 the invention is shown as applied to a wind-screen formed in two parts E and E¹, the part E¹ being carried on pivot pins $g$, which replace the shaft D, and on one of which a box B, (constructed and the parts therein operating as hereinbefore described) is mounted. The box B, and the pivot pins are supported by arms $g$ projecting from the bosses $e$. The box B can contain lubricant if desired.

The handle $f^2$, can be rotated by one hand and, when rotated, will convey such movement to the worm-wheel C and to the wind-screen E or E¹ to adjust the said screen to any desired angle and the pitch of the worm-teeth on the wheel C, and of the worm-pinion F, is such that they remain locked in the position they are in when the adjustment has been effected and thus will hold the wind-screen in the position to which it has been brought.

I am aware that it has been proposed to use worm wheel gearing in adjustable joints for the purpose of adjusting fanlights, ventilators, casements, book or music stands, swing-mirrors and other articles of furniture, and to such I make no claim.

What I claim as my invention and desire to secure by Letters Patent, is:—

In combination with a vehicle having a dash board or like supporting portion, arms pivotally mounted thereon, means for tilting and locking said arms in their tilted position, a wind shield rigidly secured to said arms and disposed between the same, a second wind shield pivoted to the top of said arms and disposed between the same, and means carried by the top of one of said arms for tilting said second shield and locking the same in a tilted position, substantially as described.

In testimony whereof I affix my signature in presence of two witnesses.

GEORGE RICHARD INSHAW.

Witnesses:
JOHN GEORGE INSHAW,
EDITH MARION INSHAW.